(12) United States Patent
Uchida

(10) Patent No.: US 12,337,895 B2
(45) Date of Patent: Jun. 24, 2025

(54) LANE DEPARTURE SUPPRESSION DEVICE

(71) Applicant: TOYOTA JIDOSHA KABUSHIKI KAISHA, Toyota (JP)

(72) Inventor: Risa Uchida, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 201 days.

(21) Appl. No.: 18/211,122

(22) Filed: Jun. 16, 2023

(65) Prior Publication Data

US 2024/0067267 A1 Feb. 29, 2024

(30) Foreign Application Priority Data

Aug. 29, 2022 (JP) ................. 2022-135525

(51) Int. Cl.
*B62D 15/02* (2006.01)
*B60Q 9/00* (2006.01)

(52) U.S. Cl.
CPC .......... *B62D 15/0255* (2013.01); *B60Q 9/00* (2013.01)

(58) Field of Classification Search
CPC .... B62D 6/00; B62D 15/0265; B62D 15/029; B62Q 9/00; B60W 30/09; B60W 30/16; B60W 30/18163; B60W 50/16; B60W 2050/143; B60W 2050/146
See application file for complete search history.

(56) References Cited

U.S. PATENT DOCUMENTS

| | | | |
|---|---|---|---|
| 5,982,278 A | 11/1999 | Cuvelier | |
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2015/0203126 A1* | 7/2015 | Kobana | B60W 50/12 701/1 |
| 2021/0309242 A1* | 10/2021 | Hayakawa | B60K 35/22 |

(Continued)

FOREIGN PATENT DOCUMENTS

| | | |
|---|---|---|
| CN | 109263647 A | 1/2019 |
| JP | 2011-168194 A | 9/2011 |

*Primary Examiner* — John Kwon
(74) *Attorney, Agent, or Firm* — Sughrue Mion, PLLC

(57) ABSTRACT

A lane departure suppression device includes an object information acquisition device configured to acquire object information around a vehicle, and an electronic control device. The electronic control device is configured not to execute lane departure suppression control when determination is made that there is a possibility or a fact of lane departure of the vehicle and that a driver intends the lane departure. The electronic control device is configured to execute at least issuance of alert as the lane departure suppression control when the determination is made that there is the possibility or the fact of the lane departure of the vehicle and that the driver intends the lane departure but determination is made that a traveling lane of the vehicle is a lane-off prohibition lane or an overtaking prohibition lane based on the object information.

5 Claims, 5 Drawing Sheets

(56) References Cited

U.S. PATENT DOCUMENTS

| | | | |
|---|---|---|---|
| 2022/0105984 A1* | 4/2022 | Kojo | B60W 30/12 |
| 2023/0294672 A1* | 9/2023 | Kato | B60W 50/14 |
| | | | 701/301 |
| 2023/0311875 A1* | 10/2023 | Nishiguchi | B60W 30/18163 |
| | | | 701/25 |
| 2024/0034362 A1* | 2/2024 | Oba | B60W 60/0051 |

* cited by examiner

LANE DEPARTURE SUPPRESSION DEVICE

CROSS-REFERENCE TO RELATED APPLICATION

This application claims priority to Japanese Patent Application No. 2022-135525 filed on Aug. 29, 2022, incorporated herein by reference in its entirety.

BACKGROUND

1. Technical Field

The present disclosure relates to a lane departure suppression device.

2. Description of Related Art

A lane departure suppression device detects the position of a vehicle with respect to a lane, and executes lane departure suppression control of at least one of issuance of alert and automatic steering of steered wheels when determination is made that the vehicle may depart from the lane based on the detected position of the vehicle.

When determination is made that the vehicle may depart from the lane but the driver intends to depart from the lane as in a case of changing lanes, it is necessary to restrict the lane departure suppression control. Whether the driver intends to depart from the lane is determined based on, for example, a driver's steering operation, a driver's operation on a turn signal lever, and an inclination angle of the vehicle with respect to the lane, that is, a skew angle.

For example, Japanese Unexamined Patent Application Publication No. 2011-168194 (JP 2011-168194 A) describes that lane departure suppression control is restricted when a steering speed equal to or higher than a reference value, a steering torque equal to or larger than a reference value, and/or a steering torque change amount equal to or larger than a reference value are/is detected. According to this type of lane departure suppression device, it is possible to reduce the possibility that the driver feels annoyed with unnecessary alert and automatic steering interferes with the driver's driving operation in a situation in which the driver intends to depart from the lane as in the case of changing lanes.

SUMMARY

In the lane departure suppression device described in JP 2011-168194 A, the lane departure suppression control is restricted when determination is made that the driver intends to depart from the lane even though the vehicle may depart from the lane in a situation in which the vehicle travels in a zone where the vehicle is prohibited from traveling off the lane or in a zone where the vehicle is prohibited from overtaking. Therefore, the lane departure is prohibited by the law but the issuance of alert or the automatic steering for suppressing the lane departure is not executed. Thus, the lane departure cannot effectively be suppressed to cause the vehicle to travel in compliance with the law.

The present disclosure provides a lane departure suppression device improved so that lane departure suppression control is not executed in a situation in which the lane departure suppression control should be restricted, and lane departure can be suppressed in a situation in which the lane departure is prohibited by the law.

A lane departure suppression device according to an aspect of the present disclosure includes an object information acquisition device configured to acquire object information around a vehicle, and an electronic control device. The electronic control device is configured to determine whether there is a possibility or a fact of lane departure of the vehicle based on the object information acquired by the object information acquisition device. The electronic control device is configured to execute at least one of issuance of alert and automatic steering as lane departure suppression control when determination is made that there is the possibility or the fact of the lane departure of the vehicle and that a driver does not intend the lane departure. The electronic control device is configured not to execute the lane departure suppression control when determination is made that there is the possibility or the fact of the lane departure of the vehicle and that the driver intends the lane departure. The electronic control device is configured to execute at least the issuance of the alert as the lane departure suppression control when the determination is made that there is the possibility or the fact of the lane departure of the vehicle and that the driver intends the lane departure but determination is made that a traveling lane of the vehicle is a lane-off prohibition lane or an overtaking prohibition lane based on the object information.

According to the above configuration, when determination is made that there is the possibility or the fact of the lane departure of the vehicle and that the driver intends the lane departure but determination is made that the traveling lane of the vehicle is the lane-off prohibition lane or the overtaking prohibition lane based on the object information, at least the issuance of the alert is executed as the lane departure suppression control.

Thus, when the traveling lane of the vehicle is the lane-off prohibition lane or the overtaking prohibition lane, the lane departure can be suppressed so that the vehicle travels in compliance with the law at least by the issuance of the alert. When the traveling lane of the vehicle is not the lane-off prohibition lane or the overtaking prohibition lane, the lane departure suppression control is not executed. Therefore, it is possible to reduce the possibility that the driver feels annoyed with unnecessary alert and the automatic steering interferes with the driver's driving operation.

In the lane departure suppression device according to the aspect of the present disclosure, the electronic control device may be configured to execute the issuance of the alert and the automatic steering when determination is made that, in a situation in which the determination is made that there is the possibility or the fact of the lane departure of the vehicle and that the driver intends the lane departure, the traveling lane of the vehicle is the lane-off prohibition lane or the overtaking prohibition lane based on the object information and a preceding vehicle is not present ahead of the vehicle. The electronic control device may be configured to execute the issuance of the alert and not to execute the automatic steering when determination is made that, in the situation in which the determination is made that there is the possibility or the fact of the lane departure of the vehicle and that the driver intends the lane departure, the traveling lane of the vehicle is the lane-off prohibition lane or the overtaking prohibition lane based on the object information and the preceding vehicle is present ahead of the vehicle.

According to the above configuration, the lane departure can be suppressed so that the vehicle travels in compliance with the law by the issuance of the alert and the automatic steering when determination is made that the traveling lane of the vehicle is the lane-off prohibition lane or the overtaking prohibition lane based on the object information and that the preceding vehicle is not present ahead of the vehicle in the situation in which determination is made that there is the possibility or the fact of the lane departure of the vehicle and that the driver intends the lane departure (hereinafter referred to as "above situation" as necessary).

When determination is made, in the above situation, that the traveling lane of the vehicle is the lane-off prohibition lane or the overtaking prohibition lane based on the object information and that the preceding vehicle is present ahead of the vehicle, the issuance of the alert is executed and the automatic steering is not executed. Therefore, it is possible to suppress the lane departure by the issuance of the alert, and to reduce the possibility that the automatic steering interferes with the driver's driving operation.

In the lane departure suppression device according to the aspect of the present disclosure, the electronic control device may be configured not to execute the lane departure suppression control when determination is made that, in the situation in which the determination is made that there is the possibility or the fact of the lane departure of the vehicle and that the driver intends the lane departure, the traveling lane of the vehicle is neither the lane-off prohibition lane nor the overtaking prohibition lane based on the object information.

According to the above configuration, when determination is made, in the above situation, that the traveling lane of the vehicle is neither the lane-off prohibition lane nor the overtaking prohibition lane based on the object information, the lane departure suppression control is not executed. Thus, it is possible to reduce the possibility that the driver feels annoyed with unnecessary alert and the automatic steering interferes with the driver's driving operation.

In the lane departure suppression device according to the aspect of the present disclosure, the electronic control device may be configured to determine that the driver intends the lane departure when determination is made that a turn signal lever is tilted in a lane departure direction or that a steering operation is performed in the lane departure direction.

According to the above configuration, determination can be made that the driver intends the lane departure when the turn signal lever is tilted in the lane departure direction or the steering operation is performed in the lane departure direction.

In the lane departure suppression device according to the aspect of the present disclosure, the alert may include information indicating that the lane departure of the vehicle is not permitted because the traveling lane of the vehicle is the lane-off prohibition lane or the overtaking prohibition lane.

According to the above configuration, the driver can easily and clearly understand the reason why the lane departure is not permitted as well as the possibility or the fact of the lane departure, compared to a case where the display of a sign for lane-off prohibition or the like and the issuance of alert for the possibility of the lane departure or the like are executed independently of each other.

In the present disclosure, "prohibition of traveling off the lane" will be referred to as "lane-off prohibition" as necessary, and "prohibition of traveling off the lane or prohibition of overtaking" will be referred to as "lane departure prohibition" as necessary.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A lane departure suppression device according to embodiments of the present disclosure will be described in detail with reference to the accompanying drawing.

First Embodiment

Figure 1:
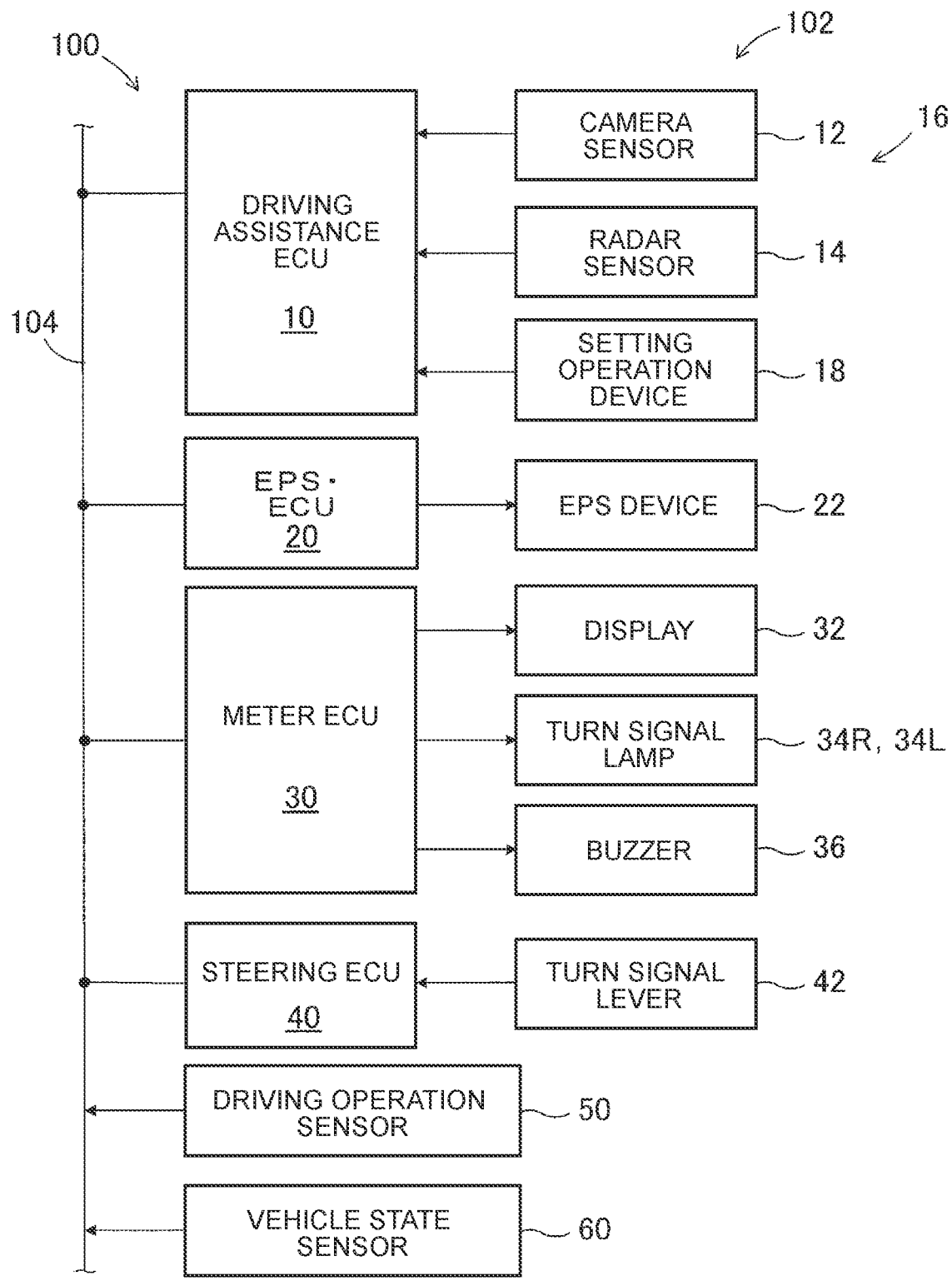
FIG. 1 is a schematic configuration diagram showing a lane departure suppression device according to a first embodiment.

As shown in FIG. 1, a lane departure suppression device 100 according to a first embodiment of the present disclosure is applied to a vehicle 102 and includes a driving assistance electronic control unit (ECU) 10. The vehicle 102 may be a vehicle capable of autonomous driving, and includes an electric power steering ECU 20, a meter ECU 30, and a steering ECU 40. The ECU means an electronic control unit including a microcomputer as its main unit. In the following description, the vehicle 102 will be referred to as "target vehicle 102" as necessary to distinguish it from other vehicles, and the electric power steering will be referred to as "EPS".

The microcomputer of each ECU includes a central processing unit (CPU), a read-only memory (ROM), a random access memory (RAM), a readable and writable non-volatile memory (N/M), an interface (I/F), and the like. The CPU implements various functions by executing instructions (programs, routines) stored in the ROM. These ECUs are connected to each other such that data is exchangeable (communicable) via a controller area network (CAN) 104. Therefore, detected values of sensors (including switches) connected to a specific ECU are transmitted to other ECUs as well.

The driving assistance ECU 10 is a central control device that executes driving assistance control such as lane departure suppression control and adaptive cruise control. In the embodiment, the driving assistance ECU 10 cooperates with other ECUs to execute the lane departure suppression control as described in detail later.

A camera sensor 12 and a radar sensor 14 are connected to the driving assistance ECU 10. The camera sensor 12 includes a plurality of camera sensors that captures at least forward images. The radar sensor 14 includes a plurality of radar sensors that acquires information on objects present at least in a forward area. The camera sensor 12 and the radar sensor 14 function as an object information acquisition device 16 that acquires information on an object around the target vehicle 102.

Although illustration is omitted in the drawing, each camera sensor of the camera sensor 12 includes a camera unit that captures an image of surroundings of the vehicle 102, and a recognition unit that analyzes image data obtained by capturing an image by the camera unit and recognizes objects such as lane marking lines on roads, traffic signs, and other vehicles. The recognition unit supplies information related to the recognized object to the driving assistance ECU 10 every predetermined time.

Figure 4:
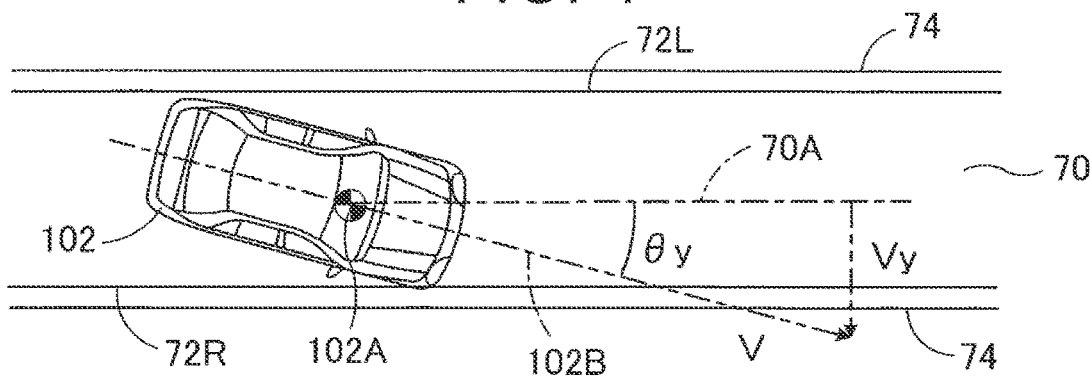
FIG. 4 is a diagram showing a situation in which a vehicle travels at an angle with respect to a longitudinal direction of a lane.

In particular, in the embodiment, as shown in FIG. 4, the camera sensor 12 can detect a positional relationship of the vehicle with respect to a lane 70 based on a positional relationship of the vehicle 102 with respect to lane marking lines 72R and 72L that are boundaries of the lane 70 (referred to as "lane boundaries"). The position of the vehicle 102 is a reference position 102A of the vehicle, and may be a position of the center of gravity of the vehicle or a central position of the vehicle in plan view. A lateral position of the vehicle described later represents the reference position in a lane width direction, and a lateral speed of the vehicle represents a speed at the reference position in the lane width direction. These are acquired based on the relative positional relationship between the lane marking line detected by the camera sensor 12 and the vehicle.

Each radar sensor of the radar sensor 14 includes a radar transmission-reception unit and a signal processing unit (not shown). The radar transmission-reception unit radiates radio waves in a millimeter wave band (hereinafter referred to as "millimeter waves"), and receives the millimeter waves (that is, reflected waves) reflected by three-dimensional objects present in a radiation range (for example, other vehicles and bicycles). The signal processing unit supplies information indicating a distance between the target vehicle and the three-dimensional object, a relative speed of the target vehicle with respect to the three-dimensional object, a relative position (direction) of the three-dimensional object with respect to the target vehicle, and the like to the driving assistance ECU 10 every predetermined time based on a phase difference between the transmitted millimeter wave and the received reflected wave, an attenuation level of the reflected wave, a period from the transmission of the millimeter wave to the reception of the reflected wave, and the like. A light detection and ranging (LiDAR) sensor may be used instead of the radar sensor 14.

A setting operation device 18 is connected to the driving assistance ECU 10, and is provided at a position where the setting operation device 18 is operated by a driver. Although illustration is omitted in FIG. 1, the setting operation device 18 includes a lane departure suppression control switch. The driving assistance ECU 10 executes the lane departure suppression control when the lane departure suppression control switch is ON.

An EPS device 22 is connected to the EPS-ECU 20. The EPS-ECU 20 controls a steering assist torque by controlling the EPS device 22 in a manner known in the art based on a steering torque Ts and a vehicle speed V detected by a driving operation sensor 50 and a vehicle state sensor 60 described later, and reduces a steering load of the driver. The EPS-ECU 20 can turn steered wheels as necessary by controlling the EPS device 22. Thus, the EPS-ECU 20 and the EPS device 22 function as an automatic steering device that automatically steers the steered wheels as necessary.

A display 32, turn signal lamps 34R, 34L, and a buzzer 36 that sounds alert are connected to the meter ECU 30. The display 32 may be, for example, a head-up display or a multi-information display on which meters and various types of information are displayed, or may be a display of a navigation device (not shown). A speaker may be connected to the meter ECU 30 instead of or together with the buzzer 36.

A turn signal lever 42 provided on a steering column (not shown) is connected to the steering ECU 40. When the turn signal lever 42 is tilted in a vertical direction corresponding to a right-turn direction and a left-turn direction, a signal indicating the tilt is supplied to the meter ECU 30, thereby causing the right or left turn signal lamp 34R or 34L to blink.

The driving operation sensor 50 and the vehicle state sensor 60 are connected to the CAN 104. Information detected by the driving operation sensor 50 and the vehicle state sensor 60 (hereinafter referred to as "sensor information") is transmitted to the CAN 104. The sensor information transmitted to the CAN 104 can be used as appropriate in each ECU. The sensor information may be information of a sensor connected to a specific ECU, and may be transmitted from the specific ECU to the CAN 104.

The driving operation sensor 50 includes a drive operation amount sensor that detects an operation amount of an accelerator pedal, a braking operation amount sensor that detects a master cylinder pressure or a depression force applied to a brake pedal, and the like. The driving operation sensor 50 further includes a steering angle sensor that detects a steering angle θ, a steering torque sensor that detects the steering torque Ts, and the like.

The vehicle state sensor 60 includes a vehicle speed sensor that detects a vehicle speed of the vehicle 102, a longitudinal acceleration sensor that detects a longitudinal acceleration of the vehicle, a lateral acceleration sensor that detects a lateral acceleration of the vehicle, a yaw rate sensor that detects a yaw rate of the vehicle, and the like.

Figure 2:
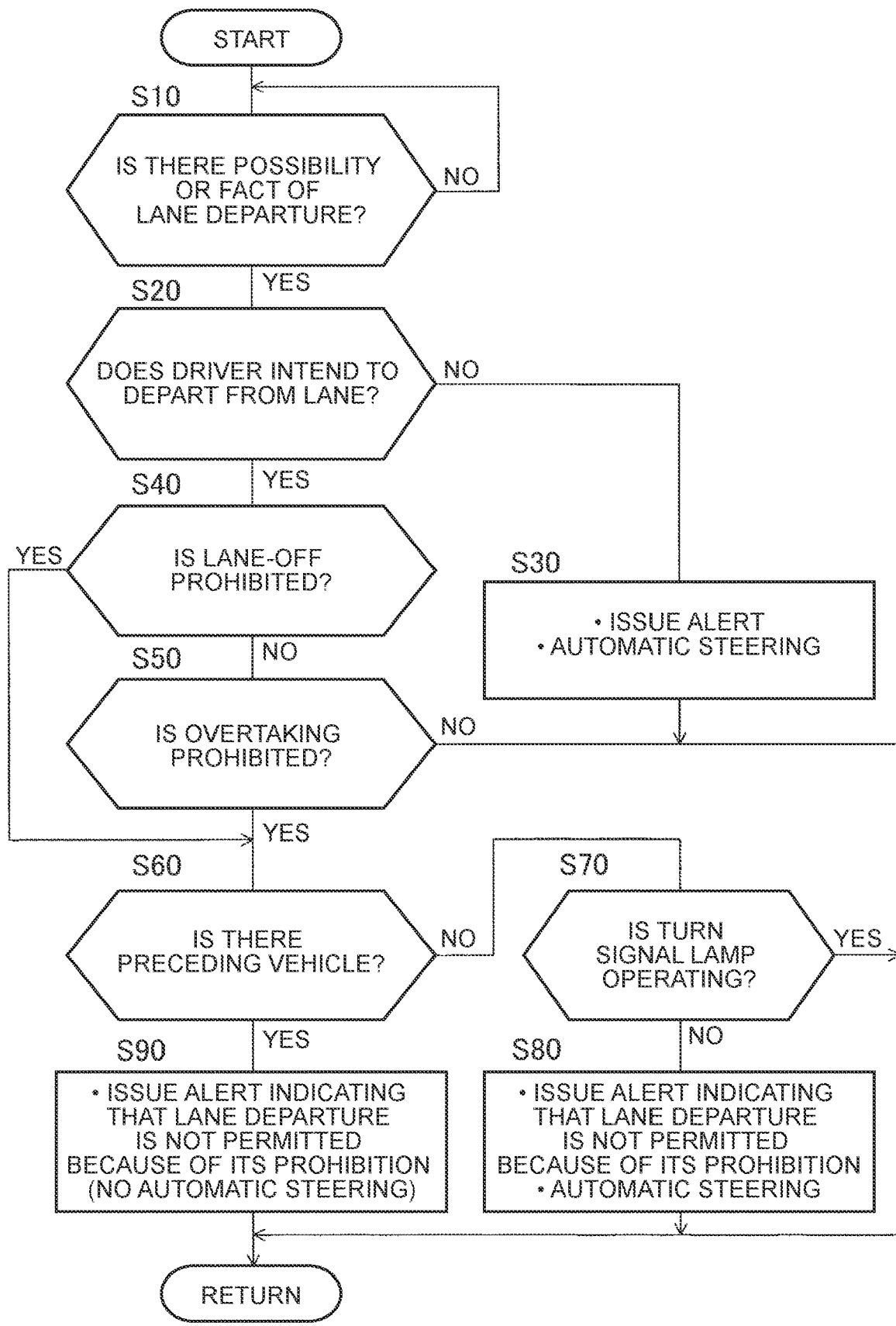
FIG. 2 is a flowchart showing a lane departure suppression control routine according to the first embodiment.

The CPU of the driving assistance ECU 10 executes the lane departure suppression control in accordance with a flowchart shown in FIG. 2 when the lane departure suppression control switch of the setting operation device 18 is turned ON by the driver. The lane departure suppression control in accordance with the flowchart shown in FIG. 2 is lane departure suppression control for Japan, and its program is stored in the ROM of the driving assistance ECU 10.

Lane Departure Suppression Control Program in First Embodiment

Next, a lane departure suppression control program in the first embodiment will be described with reference to the flowchart shown in FIG. 2. In the first embodiment, a lane departure suppression method in the first embodiment is executed by executing the lane departure suppression control in accordance with the flowchart shown in FIG. 2.

In step S10, the CPU first determines whether there is a possibility or a fact of lane departure. That is, the CPU determines whether the vehicle has a possibility of departing or has departed from a lane detected by the camera sensor 12 in a manner known in the art based on a relative positional relationship of the vehicle 102 with respect to the lane. When the CPU makes negative determination, the CPU temporarily terminates the control. When the CPU makes positive determination, the CPU advances the control to step S20.

In this case, the determination as to whether the vehicle 102 has a possibility of departing from the lane may be made, for example, in the following manner. First, as shown in FIG. 4, an angle θy formed by a traveling direction 102B of the vehicle with respect to a longitudinal direction 70A of the lane 70 is estimated based on image information on a view ahead of the vehicle 102. A moving speed Vy of the vehicle 102 in a direction perpendicular to the longitudinal direction 70A of the lane 70 is estimated as V sinθy based on the angle θy and the vehicle speed V.

A distance Dy (not shown) in the lane width direction between a departure determination reference line 74 that the vehicle 102 is approaching and the reference position 102A of the vehicle is estimated. Determination may be made that the vehicle 102 has a possibility of departing from the lane when Dy−VyΔt is equal to or smaller than a preset reference value Dyc (positive constant), provided that Δt is a preset period. In FIG. 4, the departure determination reference line 74 is positioned outside the lane marking lines 72R and 72L that are the boundary lines of the lane 70, but may be positioned inside or on the lane marking lines 72R and 72L.

In step S20, the CPU determines whether the driver intends to depart from the lane in a manner known in the art. When the CPU makes positive determination, the CPU advances the control to step S40. When the CPU makes negative determination, the CPU advances the control to step S30.

For example, determination may be made that the driver intends to depart from the lane when the turn signal lever 42 is tilted in a lane departure direction or a steering operation is being performed in the lane departure direction. Whether the steering operation is being performed in the lane departure direction may be determined, for example, based on the steering torque Ts, and may be determined based on the steering torque Ts and the yaw rate of the vehicle.

In step S30, the CPU operates the buzzer 36 to sound alert, and causes the display 32 to display alert indicating that the vehicle 102 has a possibility of departing or has departed from the lane. When the possibility or the degree of lane departure further increases, the CPU outputs an automatic steering command signal to the EPS-ECU 20 to execute automatic steering to prevent the vehicle 102 from departing from the lane or to terminate the situation in which the vehicle 102 is departing from the lane. The alert may be visual alert by the display 32, an alert lamp, or the like, auditory alert by the buzzer 36, the speaker, or the like, or sensory alert by vibration of the seat, or may be any combination thereof.

In step S40, the CPU determines, based on information supplied from the camera sensor 12, whether the current traveling lane of the vehicle 102 is a lane-off prohibition lane. When the CPU makes positive determination, the CPU advances the control to step S60. When the CPU makes negative determination, the CPU advances the control to step S50.

Figure 5A:
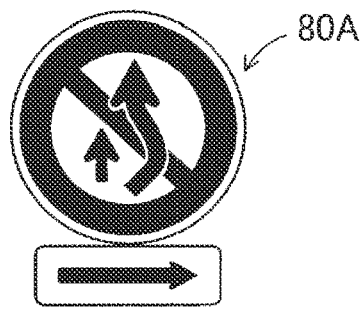
FIG. 5A is a diagram showing a start sign of a lane-off prohibition zone.
Figure 5B:
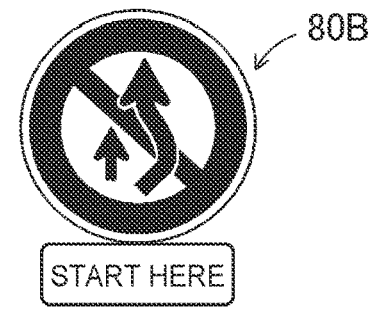
FIG. 5B is a diagram showing a start sign of the lane-off prohibition zone.
Figure 5C:
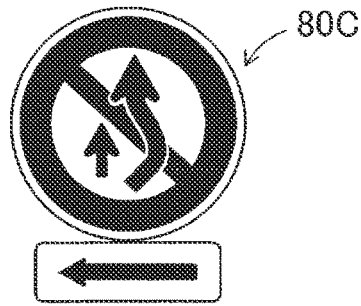
FIG. 5C is a diagram showing an end sign of the lane-off prohibition zone.
Figure 5D:
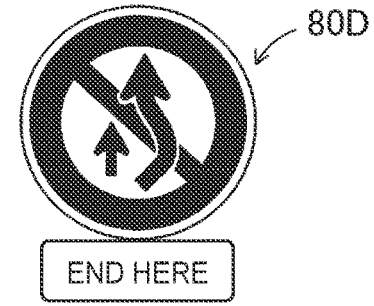
FIG. 5D is a diagram showing an end sign of the lane-off prohibition zone.
Figure 5E:
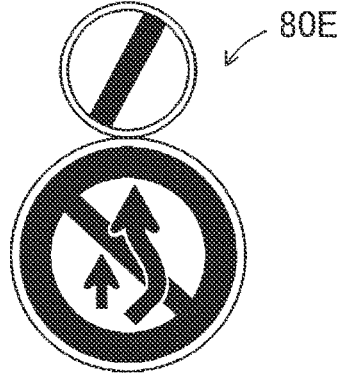
FIG. 5E is a diagram showing an end sign of the lane-off prohibition zone.

In this case, determination may be made that the lane is the lane-off prohibition lane during a period from detection of a start sign 80A or 80B of a lane-off prohibition zone shown in FIG. 5A or 5B to detection of any one of end signs 80C to 80E of the lane-off prohibition zone shown in FIGS. 5C to 5E. When the lane is the lane-off prohibition lane, the vehicle 102 can overtake a preceding vehicle unless the vehicle 102 travels off the lane.

In step S50, the CPU determines, based on information supplied from the camera sensor 12, whether the current traveling lane of the vehicle 102 is an overtaking prohibition lane. When the CPU makes negative determination, the CPU temporarily terminates the control. When the CPU makes positive determination, the CPU advances the control to step S60.

Figure 6A:
FIG. 6A is a diagram showing a start sign of an overtaking prohibition zone.
Figure 6B:
FIG. 6B is a diagram showing a start sign of the overtaking prohibition zone.
Figure 6C:
FIG. 6C is a diagram showing an end sign of the overtaking prohibition zone.
Figure 6D:
FIG. 6D is a diagram showing an end sign of the overtaking prohibition zone.
Figure 6E:
FIG. 6E is a diagram showing an end sign of the overtaking prohibition zone.

In this case, determination may be made that the lane is the overtaking prohibition lane during a period from detection of a start sign 82A or 82B of an overtaking prohibition zone shown in FIG. 6A or 6B to detection of any one of end signs 82C to 82E of the overtaking prohibition zone shown in FIGS. 6C to 6E. Although illustration is omitted in the drawings, determination may be made that the lane is the overtaking prohibition lane when the right lane marking line is yellow.

In step S60, the CPU determines, based on information supplied from the camera sensor 12 and the radar sensor 14, whether a preceding vehicle to overtake is present ahead of the vehicle 102. When the CPU makes positive determination, the CPU advances the control to step S90. When the CPU makes negative determination, the CPU advances the control to step S70.

In this case, determination may be made that the preceding vehicle to overtake is present when the preceding vehicle is within a range of a reference distance or smaller from the vehicle 102, the preceding vehicle is a vehicle other than a stopped vehicle or a light vehicle (for example, a bicycle), and the relative vehicle speed of the target vehicle to the preceding vehicle is a positive value. The reference distance may be a constant positive value, or may be variably set depending on the vehicle speed of the target vehicle to increase as the vehicle speed of the target vehicle increases.

In step S70, the CPU determines whether the turn signal lamp 34R or 34L on the lane departure side is blinking. When the CPU makes positive determination, the CPU temporarily terminates the control. When the CPU makes negative determination, the CPU advances the control to step S80.

In step S80, the CPU issues, by displaying on the display 32, alert including information indicating that the lane departure is not permitted because the current traveling lane of the vehicle 102 is a lane where the lane departure is prohibited. The CPU executes automatic steering to prevent the vehicle 102 from departing from the lane or to terminate the situation in which the vehicle 102 is departing from the lane.

In step S90, similarly to step S80, the CPU issues, by displaying on the display 32, alert including information indicating that the lane departure is not permitted because the current traveling lane of the vehicle 102 is a lane-off prohibition lane or an overtaking prohibition lane. However, the CPU does not execute automatic steering.

In a case where the current traveling lane of the vehicle 102 is a lane-off prohibition lane, the alert in steps S80 and S90 may include, for example, a message "the vehicle cannot travel off the lane because of lane-off prohibition". In a case where the lane is an overtaking prohibition lane, the alert in steps S80 and S90 may include, for example, a message "the vehicle cannot overtake or travel off the lane because of overtaking prohibition".

Operations in First Embodiment

Next, operations in the first embodiment will be described for various cases where there is a possibility or a fact of lane departure and therefore positive determination is made in step S10 but situations are different.

A. Case Where Driver Does Not Intend to Depart from Lane

Since the driver does not intend to depart from the lane, negative determination is made in step S20, and the lane departure suppression control is executed in step S30. That is, the buzzer 36 is operated to sound alert, and the display 32 displays the possibility or the fact that the vehicle departs from the lane. When the possibility or the degree of lane departure further increases, automatic steering is executed.

B. Case Where Driver Intends to Depart from Lane and Lane Departure Is Not Prohibited Positive determination is made in steps S10 and S20, but negative determination is made in steps S40 and S50. Therefore, neither of steps S80 and S90 is executed. Thus, the lane departure suppression control is not executed. Accordingly, in a situation in which the driver intends to depart from the lane as in a case of changing lanes, overtaking, or transitioning to a branch road or a crossing road, it is possible to prevent the driver from feeling annoyed with unnecessary execution of the lane departure suppression control and the automatic steering from interfering with the driver's driving operation.

C. Case where Driver Intends to Depart from Lane but Lane Departure is Prohibited Positive determination is made in steps S10 and S20, and positive determination is made in step S40 or S50. Therefore, step S80 or S90 is basically executed. Thus, the lane departure suppression control is executed. Therefore, when determination is made that there is a possibility or a fact that the vehicle departs from the lane and that the driver intends to depart from the lane but determination is made that the traveling lane of the vehicle is the lane where the lane departure is prohibited, at least issuance of alert is executed as the lane departure suppression control. Thus, when the traveling lane of the vehicle is the lane where the lane departure is prohibited, the lane departure can be suppressed so that the vehicle travels in compliance with the law at least by issuing alert.

In particular, in a case where the lane is a lane-off prohibition lane, the alert includes, for example, a message "the vehicle cannot travel off the lane because of lane-off prohibition", and in a case where the lane is an overtaking prohibition lane, the alert includes, for example, a message "the vehicle cannot overtake or travel off the lane because of overtaking prohibition". Therefore, the driver can easily and clearly understand the reason why the lane departure is not permitted as well as the possibility or the fact of lane departure, compared to a case where the display of a sign for lane-off prohibition or the like and the issuance of alert for the possibility of lane departure or the like are executed independently of each other.

C-1. Case Where No Preceding Vehicle Is Present and Turn Signal Lamp Is Operating In steps S60 and S70, negative determination and positive determination are made, respectively. Therefore, neither of steps S80 and S90 is executed similarly to case B. Thus, the lane departure suppression control is not executed. Accordingly, in a situation in which the driver intends to depart from the lane as in a case of changing lanes, overtaking, or transitioning to a branch road or a crossing road, it is possible to prevent the driver from feeling annoyed with unnecessary execution of the lane departure suppression control and the automatic steering from interfering with the driver's driving operation.

C-2. Case Where No Preceding Vehicle Is Present and Turn Signal Lamp Is Not Operating Negative determination is made in steps S60 and S70. Therefore, alert is issued and automatic steering is executed in step S80. Therefore, the driver can easily and clearly recognize that the lane departure is not permitted because the current traveling lane of the vehicle 102 is a lane where the lane departure is prohibited, and the steering to prevent or terminate the lane departure can be assisted by the automatic steering.

C-3. Case Where Preceding Vehicle Is Present

Positive determination is made in step S60. Therefore, alert is issued in step S90. Therefore, the driver can easily and clearly recognize that the lane departure is not permitted because the current traveling lane of the vehicle 102 is a lane where the lane departure is prohibited. Since the automatic steering is not executed, it is possible to reduce the possibility that the automatic steering interferes with the driver's steering operation. In particular, it is possible to avoid the occurrence of a case where the target vehicle approaches the preceding vehicle due to the automatic steering.

Second Embodiment

A lane departure suppression device according to a second embodiment is applied to a vehicle traveling in Europe, and has the same configuration as that shown in FIG. 1. The ROM of the driving assistance ECU 10 stores a lane departure suppression control program of the second embodiment corresponding to a flowchart shown in FIG. 3.

Figure 3:
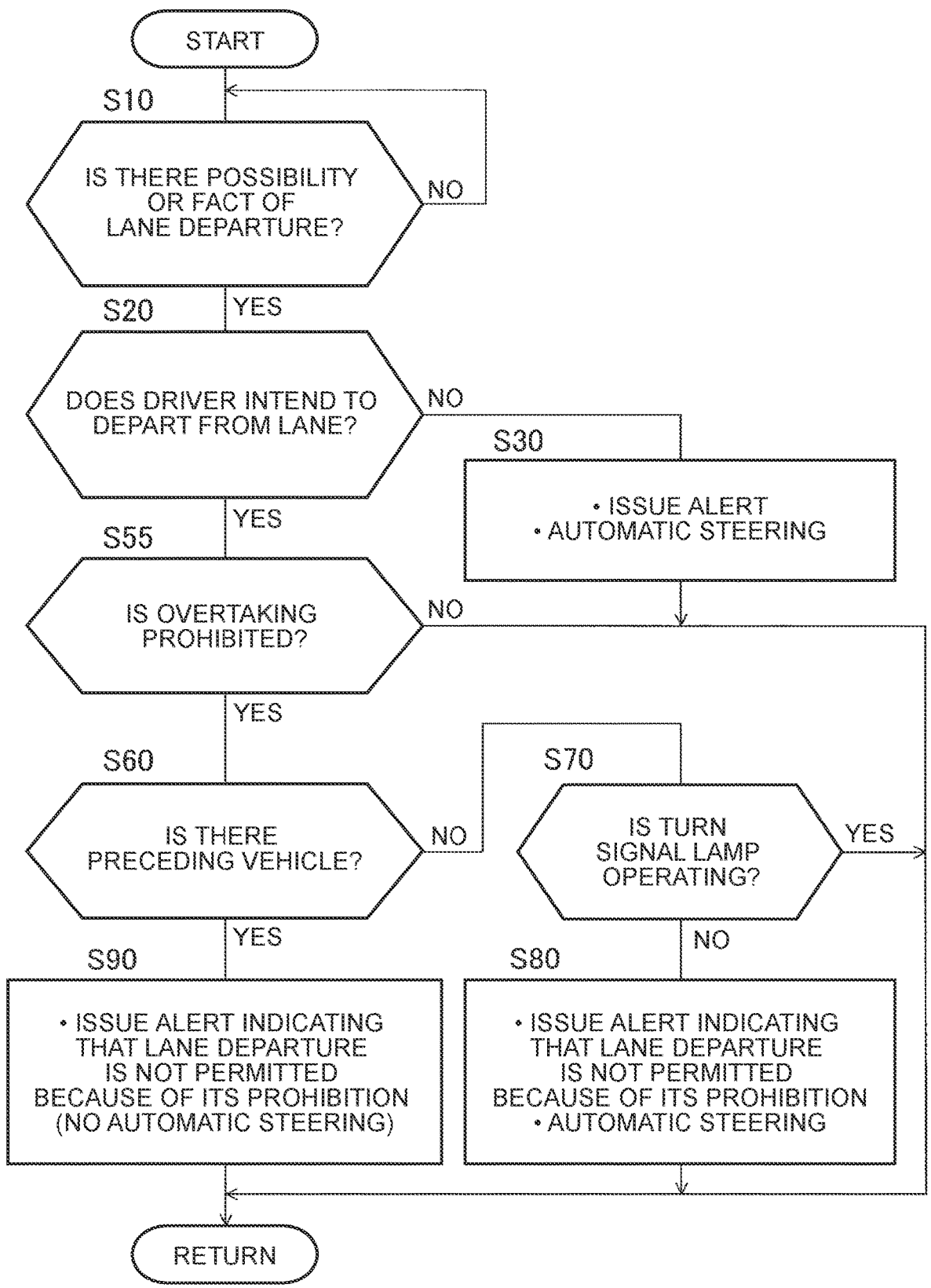
FIG. 3 is a flowchart showing a lane departure suppression control routine according to a second embodiment.

Lane departure suppression control in accordance with the flowchart shown in FIG. 3 is also executed by the CPU of the driving assistance ECU 10 when the lane departure suppression control switch (not shown in FIG. 1) of the setting operation device 18 is ON. In the second embodiment, a lane departure suppression method in the second embodiment is executed by executing the lane departure suppression control in accordance with the flowchart shown in FIG. 3.

As can be understood from comparison between FIGS. 3 and 2, steps S10 to S30 and steps S60 to S90 are executed in the same manner as steps S10 to S30 and steps S60 to S90 in the first embodiment, respectively. Step S40 in the first embodiment is not executed. When positive determination is made in step S20, step S55 corresponding to step S50 in the first embodiment is executed.

In step S55, the CPU of the driving assistance ECU 10 determines, based on information supplied from the camera sensor 12, whether the current traveling lane of the vehicle 102 is an overtaking prohibition lane. When the CPU makes negative determination, the CPU temporarily terminates the control. When the CPU makes positive determination, the CPU advances the control to step S60.

Figure 6F:
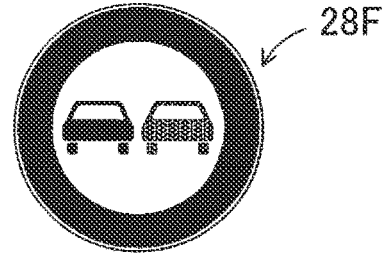
FIG. 6F is a diagram showing a start sign of the overtaking prohibition zone.
Figure 6G:
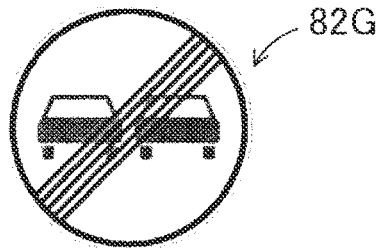
FIG. 6G is a diagram showing an end sign of the overtaking prohibition zone.
Figure 6H:
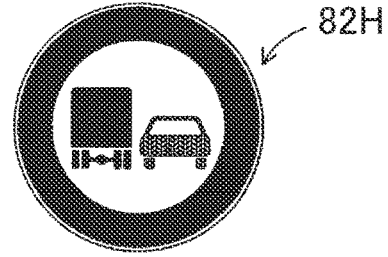
FIG. 6H is a diagram showing a start sign of the overtaking prohibition zone.

In this case, determination may be made that the lane is the overtaking prohibition lane during a period from detection of a start sign 82F of the overtaking prohibition zone shown in FIG. 6F to detection of an end sign 82G of the overtaking prohibition zone shown in FIG. 6G. In the case where the lane is the overtaking prohibition lane, overtaking is prohibited regardless of whether the vehicle travels off the lane. In a case where the target vehicle is a large-sized vehicle, determination may be made that the lane is the overtaking prohibition lane during a period from detection of a start sign of the overtaking prohibition zone shown in FIG. 6H to detection of an end sign of the overtaking prohibition zone that is not shown in FIGS. 6A to 6H.

Since step S40 in the first embodiment is not executed, the alert in steps S80 and S90 may include, for example, a message "the vehicle cannot overtake or travel off the lane because of overtaking prohibition".

As can be understood from the above description, the lane departure suppression device of the second embodiment operates in the same manner as the lane departure suppression device of the first embodiment except that step S40 is not executed and the alert in steps S80 and S90 is issued because of overtaking prohibition alone.

Thus, also in the second embodiment, when the traveling lane of the vehicle is the overtaking prohibition lane, the lane departure can be suppressed so that the vehicle travels in compliance with the law at least by issuing alert.

While the present disclosure has been described in detail above based on the specific embodiments, the present disclosure is not limited to the embodiments described above. It would be clear to a person skilled in the art that a variety of other embodiments can be made within the scope of the present disclosure.

For example, step S70 may be omitted and step S80 may be executed when negative determination is made in step S60.

Step S60 may be omitted and step S70 may be executed when positive determination is made in step S40 or S50. When positive determination is made in step S70, the lane departure suppression control is not executed. When negative determination is made, step S80 or S90 may be executed. Steps S60 and S70 may be omitted and step S80 or S90 may be executed when positive determination is made in step S40 or S50.

In step S10, the determination as to whether there is a fact of lane departure may be omitted and only the determination as to whether there is a possibility of lane departure may be made. The issuance of alert or the automatic steering to be executed as the lane departure suppression control may be omitted.

What is claimed is:

1. A lane departure suppression device comprising:
    an object information acquisition device configured to acquire object information around a vehicle; and
    an electronic control device, wherein:
    the electronic control device is configured to determine whether there is a possibility or a fact of lane departure of the vehicle based on the object information acquired by the object information acquisition device;
    the electronic control device is configured to execute at least one of issuance of alert and automatic steering as lane departure suppression control when determination is made that there is the possibility or the fact of the lane departure of the vehicle and that a driver does not intend the lane departure;
    the electronic control device is configured not to execute the lane departure suppression control when determination is made that there is the possibility or the fact of the lane departure of the vehicle and that the driver intends the lane departure; and
    the electronic control device is configured to execute at least the issuance of the alert as the lane departure suppression control when the determination is made that there is the possibility or the fact of the lane departure of the vehicle and that the driver intends the lane departure but determination is made that a traveling lane of the vehicle is a lane-off prohibition lane or an overtaking prohibition lane based on the object information.

2. The lane departure suppression device according to claim 1, wherein:
    the electronic control device is configured to execute the issuance of the alert and the automatic steering when determination is made that, in a situation in which the determination is made that there is the possibility or the fact of the lane departure of the vehicle and that the driver intends the lane departure, the traveling lane of the vehicle is the lane-off prohibition lane or the overtaking prohibition lane and a preceding vehicle is not present ahead of the vehicle based on the object information; and
    the electronic control device is configured to execute the issuance of the alert and not to execute the automatic steering when determination is made that, in the situation in which the determination is made that there is the possibility or the fact of the lane departure of the vehicle and that the driver intends the lane departure, the traveling lane of the vehicle is the lane-off prohibition lane or the overtaking prohibition lane and the preceding vehicle is present ahead of the vehicle based on the object information.

3. The lane departure suppression device according to claim 1, wherein the electronic control device is configured not to execute the lane departure suppression control when determination is made that, in the situation in which the determination is made that there is the possibility or the fact of the lane departure of the vehicle and that the driver intends the lane departure, the traveling lane of the vehicle is neither the lane-off prohibition lane nor the overtaking prohibition lane based on the object information.

4. The lane departure suppression device according to claim 1, wherein the electronic control device is configured to determine that the driver intends the lane departure when determination is made that a turn signal lever is tilted in a lane departure direction or that a steering operation is performed in the lane departure direction.

5. The lane departure suppression device according to claim 1, wherein the alert includes information indicating that the lane departure of the vehicle is not permitted because the traveling lane of the vehicle is the lane-off prohibition lane or the overtaking prohibition lane.

* * * * *